United States Patent
Holmes

(10) Patent No.: US 6,708,777 B1
(45) Date of Patent: Mar. 23, 2004

(54) COMBINATION ADJUSTABLE GRADER COMPACTOR

(76) Inventor: Jim Holmes, 218 6$^{th}$ St., Hudson, IA (US) 50643

( * ) Notice: Subject to any disclaimer, the term of this patent is extended or adjusted under 35 U.S.C. 154(b) by 0 days.

(21) Appl. No.: 09/682,675

(22) Filed: Oct. 4, 2001

(51) Int. Cl.$^7$ .............................................. A01B 29/00
(52) U.S. Cl. .................... 172/684.5; 404/128; 172/554; 172/547
(58) Field of Search ................................ 172/177, 195, 172/198, 199, 684.5, 526, 547, 554; 404/122, 124, 125, 126, 127, 128, 130

(56) References Cited

U.S. PATENT DOCUMENTS

| | | | | |
|---|---|---|---|---|
| 2,386,025 A | * | 10/1945 | Wills | 404/86 |
| 2,721,405 A | | 10/1955 | Gardner | |
| 2,891,335 A | | 6/1959 | Linneman | |
| 3,119,193 A | * | 1/1964 | Yoder et al. | 172/33 |
| 3,183,804 A | | 5/1965 | Letourneau | |
| 3,375,878 A | * | 4/1968 | Herschberger | 172/33 |
| 3,665,822 A | * | 5/1972 | Speer | 404/130 |
| 3,861,475 A | * | 1/1975 | Kuncewicz | 172/33 |
| 3,884,498 A | * | 5/1975 | Cote, Jr. | 280/762 |
| 3,889,760 A | * | 6/1975 | Manor | 172/175 |
| 3,891,342 A | | 6/1975 | Roe | |
| 3,924,689 A | * | 12/1975 | Manor | 172/799 |
| 3,986,782 A | * | 10/1976 | Durham | 404/85 |
| 4,019,268 A | * | 4/1977 | Waterman | 37/219 |
| 4,023,288 A | | 5/1977 | Roe | |
| 4,056,328 A | * | 11/1977 | Maxey | 404/96 |
| 4,079,791 A | * | 3/1978 | Yoder et al. | 172/815 |
| 4,157,877 A | * | 6/1979 | Lee | 404/128 |
| 4,269,535 A | | 5/1981 | Schultz | |
| 4,436,040 A | * | 3/1984 | Chumley | 111/130 |
| 4,490,070 A | | 12/1984 | Upchurch et al. | |
| 4,507,909 A | * | 4/1985 | Kelpin, Sr. | 56/9 |
| 4,610,567 A | | 9/1986 | Hosking | |
| 4,651,451 A | * | 3/1987 | Beeley et al. | 37/219 |
| 4,911,248 A | | 3/1990 | Schrepfer | |
| 5,062,228 A | * | 11/1991 | Artzberger | 37/407 |
| 5,067,263 A | * | 11/1991 | Pelletier | 37/220 |
| 5,172,768 A | * | 12/1992 | Straus | 172/89 |
| 5,244,306 A | * | 9/1993 | Artzberger | 404/128 |
| 5,348,418 A | * | 9/1994 | Campbell | 404/103 |
| 5,507,593 A | * | 4/1996 | Hollon et al. | 404/122 |
| 6,000,476 A | * | 12/1999 | Gall | 172/196 |
| 6,088,939 A | * | 7/2000 | Logan | 37/468 |
| 6,315,056 B1 | * | 11/2001 | Ransom et al. | 172/684.5 |
| 6,347,670 B1 | * | 2/2002 | Miskin | 172/199 |
| 6,382,873 B1 | * | 5/2002 | Mulders et al. | 404/128 |

* cited by examiner

Primary Examiner—Thomas B. Will
Assistant Examiner—Alexandra K. Pechhold
(74) Attorney, Agent, or Firm—Ryan N. Carter

(57) ABSTRACT

An adjustable compactor roller having a roller such as sheepsfoot roller mounted directly rearward of an earth leveling blade, wherein the blade is housed in a frame. The roller is mounted between roller support arms that extend forwardly and are pivotally combined with frame support arms that extend rearwardly from the frame. Hydraulic cylinders or other force assist members extend between the frame and a pivot point intermediate to the frame and the roller. In this manner, the elevation and/or the ground engagement angle of the blade may be adjusted and the compacting roller may compress leveled earth behind the blade without intervening ground engaging members disturbing the graded earth.

16 Claims, 5 Drawing Sheets

COMBINATION ADJUSTABLE GRADER COMPACTOR

BACKGROUND OF INVENTION

A basic part of any highway construction project is ground preparation and transportation of earth from one area to another by means of loading, hauling, unloading, leveling, and finally, compacting. Given the massive quantities of earth that must be moved and prepared in some projects, the cost of earthwork including equipment, energy, and labor, contributes significantly to overall project cost. There is therefore a need for improved earth grading and compacting equipment to reduce the cost of roadway preparation. In particular, there is a need for an improved grader and compactor that will allow effective leveling and compaction in fewer passes using basic vehicles rather than specifically dedicated graders and compactors.

It has been standard practice to utilize a dozer or blade to level and smooth new fill. This step typically has been followed by a separate step wherein an operator travels back and forth over the fill area with a compactor such as a sheepsfoot roller. This process enlisted two separate units and two operators, required the replacement of attachments, or required dedicated dozers or graders. Depending on the equipment used, these processes have involved highly paid skilled labor, such as dozer operators rather than tractor operators. Finally, this process resulted in additional time investment due to the increased number of passes caused by the separation of compaction and grading.

U.S. patents directed towards leveling or compacting earth include U.S. Pat. Nos. 2,721,405, 2,891,335, 3,183,804, 3,891,342, 3,924,689, 4,023,288, 4,269,535, 4,490,070, 4,610,567 and 4,911,248. Although these patents disclose various earth leveling or compacting equipment, many relate to ditch filling or compacting devices not proper for application in the large scale earthwork of roadway preparation. Further, many relate to self-propelled machines wherein rollers are positioned rearwardly of drive wheels that serve to disturb leveled fill or wherein rollers are mounted to selectively carry a portion of the vehicle weight. These devices, therefore, are not simple designs for attachment to standard tractors or other standard towing vehicles operable by workers of general rather than specialized skill.

SUMMARY OF INVENTION

The present invention is a hydraulically controlled leveling blade in a frame or housing with a compacting roller including but not limited to generally cylindrical, angular, sheepsfoot or pad foot rollers pivotally attached behind the blade which makes it possible to level earth and newly placed fill and compact it in one pass. With the blade adjustably attached directly ahead of the roller, the compacting becomes more efficient and often times fewer passes are necessary to reach the desired density. The placement of the roller behind the blade without intervening tracks, wheels, or other ground engaging surfaces permits efficient roller-compacting because the graded earth does not place upon the roller a requirement that the roller perform the role of filling voids and leveling areas of high fill.

DETAILED DESCRIPTION

Figure 1:
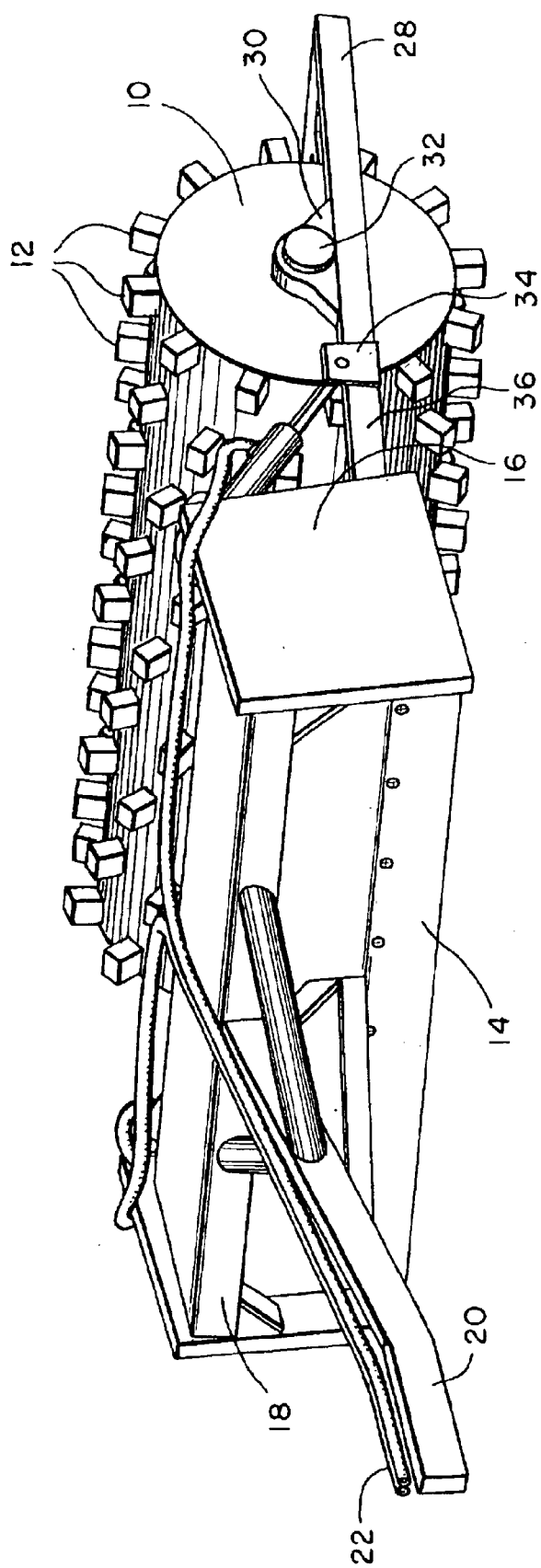
FIG. 1 is an offset top front perspective view of the combination adjustable grader compactor.
Figure 2:
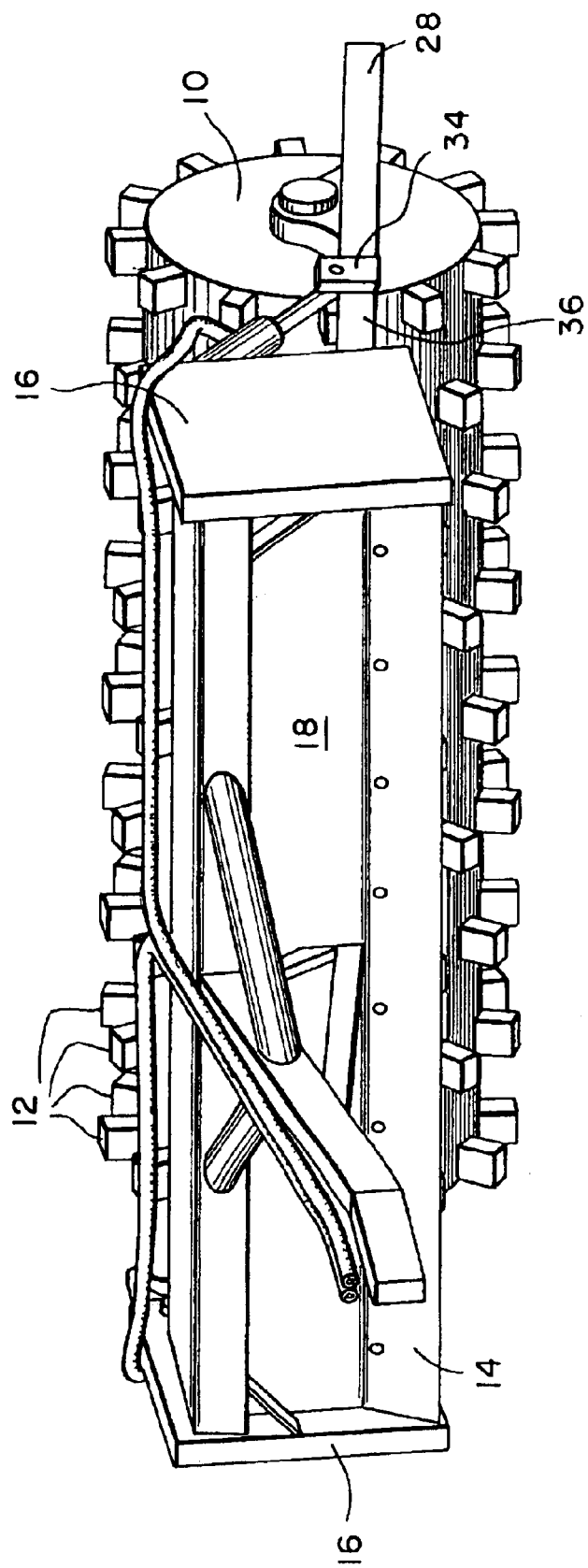
FIG. 2 is an offset front perspective view of the combination adjustable grader compactor.
Figure 3:
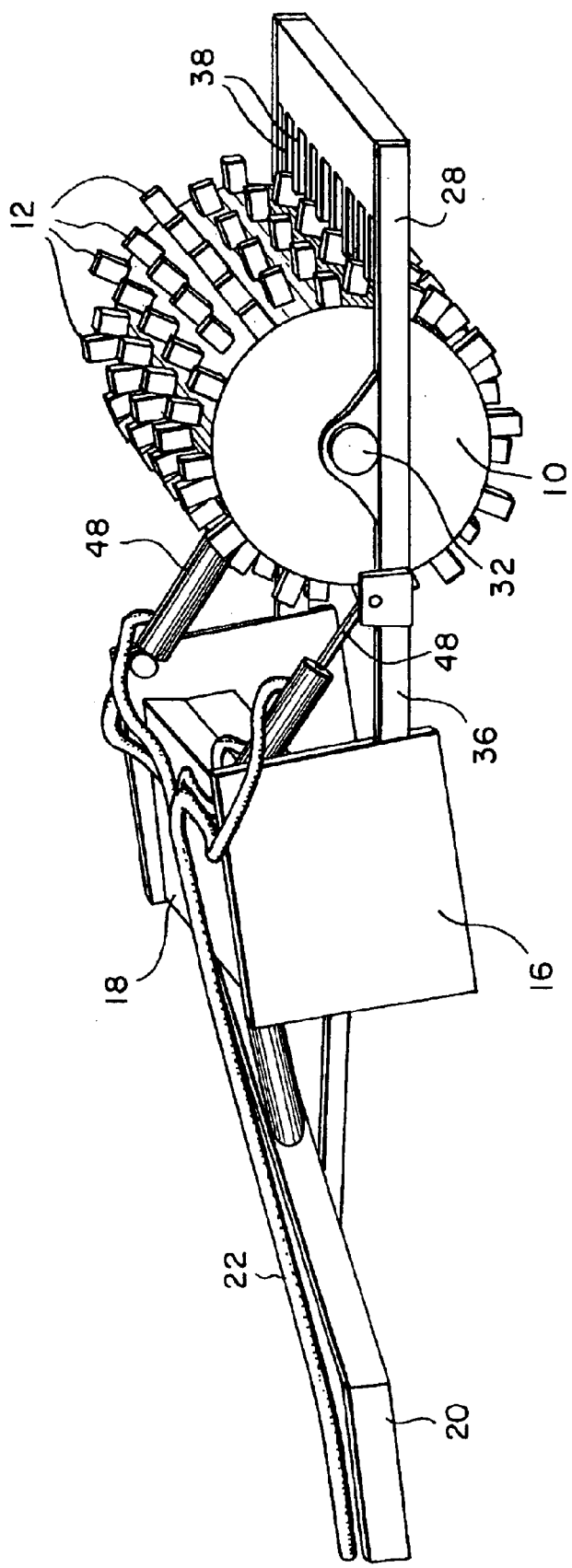
FIG. 3 is a side perspective view of the combination adjustable grader compactor.
Figure 4:
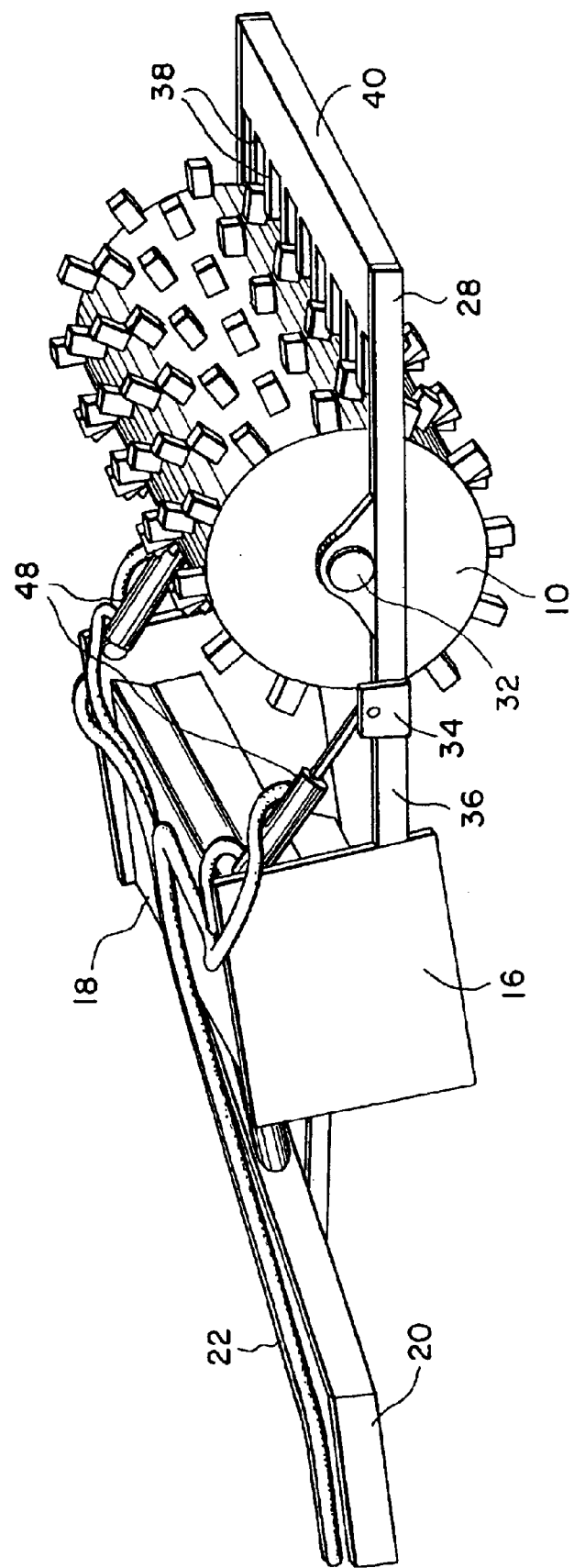
FIG. 4 is a top side perspective view of the combination adjustable grader compactor.
Figure 5:
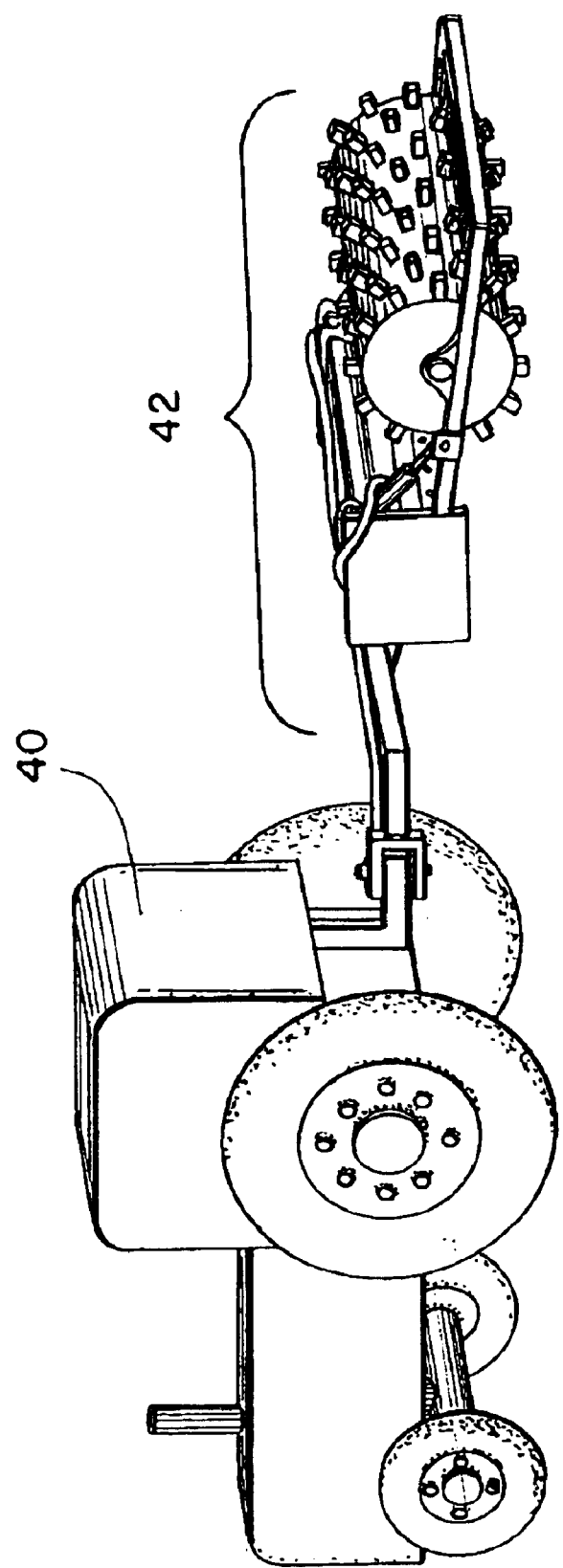
FIG. 5 is a rear perspective view of the combination adjustable grader compactor attached to a tractor.

The preferred embodiment of the present invention comprises a unit approximately nine feet wide, constructed of heavy steel plate rolled to form a blade or moldboard 14. This blade 14 is reinforced with a frame or housing 18 that may be of simple construction and that preferably comprises structural tubing 44 and angles 46 with heavy end plates 16 to enable the operator to move earth from high areas of fill and fill low areas. A hitch or tongue structure 20 and hydraulic fluid lines 22 extend forwardly from the frame for attachment to a towing vehicle. A pair of frame support arms 36 extend generally rearwardly from the frame.

The unit is controlled by two hydraulic cylinders 48 one on each end of the frame 18. These are controlled by the operator and powered by the hydraulic system of the towing unit that is in fluid communication 22 with the hydraulic cylinders 48. The hydraulic cylinders 48 extend generally rearwardly from the frame to a pivotal mounting upon a pivot member 34 such as a pivot plate or gusset plate or a heavy duty pivot pin. The frame support arms 36 also each attach to the pivot member 34 through pivotal mounting. In this manner, each end of the frame 18 has a frame support arm 36 and hydraulic cylinder 48 extending to become pivotally mounted upon pivot members 34.

Extending generally rearwardly from each pivot member 34 are roller support arms 28 that are preferably pivotally mounted to the gusset plate 34. A pair of roller mounting reinforcement members 30 are provided, each being attached to one of the roller support arms 28. The roller mounting reinforcement members each house an end of an axle 32 upon which a roller 10 is journalled. The roller is preferably cylindrical and of a sheepsfoot configuration, however, for selected applications other rollers may be employed. In this manner, the roller 10 (which may be filled with ballast such as water if desired or necessary for the target compaction density) is allowed to roll upon the ground and the extension or contraction of the hydraulic cylinder 48 causes a controlled adjustment of the blade or moldboard 14 elevation and/or ground engagement angle.

The cylindrical roller 10 preferably is comprised of two forty-two inch diameter, forty-eight inch long cylinders on which compacting tines 12 or compactor towers and tips have been installed. The roller support arms 28 carry a cross-bar 40 therebetween, preferably positioned rearward of the roller 10, having heavy cleaning tines 38 extending towards the roller 10 and being disposed to extend in alignment with the spaces between the compacting tines 12 to keep moist soil and other debris from collecting on the roller 10. As stated, the roller may be filled with additional material if weight is required.

In the preferred embodiment, the frame support arms 36 are rigidly fixed to the end or side plates 16, and the hydraulic cylinders 48 are pivotally attached to the side plates 16.

Having thus described the invention in connection with the preferred embodiments thereof, it will be evident to those skilled in the art that various revisions can be made to the preferred embodiments described herein without departing from the spirit and scope of the invention. For example, cleaning tines may be disposed above rather than rearward of the cylinder, frame configuration may vary dramatically, and the hydraulic cylinder may be replaced with alternate drive or force assist member means such as a pneumatic or electric system. It is my intention, however, that all such revisions and modifications that are evident to those skilled in the art will be included within the scope of the following claims.

What is claimed is:

1. An adjustable grader compactor for leveling earth and compacting the leveled earth which is adapted to be pulled behind a towing vehicle, said adjustable grader compactor comprising:
   a blade;
   a frame combined with said blade and extending generally upwardly therefrom;
   a rearwardly extending frame support member having a forward end and a rearward end, said frame support member being combined with said frame near said frame support member forward end;
   a force assist member having a forward end and a rearward end, said force assist member being combined with said frame near said force assist member forward end, the force assist member is combined with the frame so that the blade can adjust independently from the roller;
   a pivot member being pivotally combined with said frame support member near said frame support member rearward end and being pivotally combined with said force assist member near said force assist member rearward end;
   a roller support arm, said roller support arm being combined with said pivot member and extending generally rearwardly therefrom;
   a roller being pivotally combined with said roller support arm rearward of said pivot member; and
   a hitch extending forwardly from the frame adapted for attaching the adjustable grader compactor to the towing vehicle.

2. The adjustable grader compactor of claim 1 wherein said roller comprises a generally cylindrical roller.

3. The adjustable grader compactor of claim 1 wherein said roller comprises a generally cylindrical roller having a plurality of compaction tines extending radially therefrom.

4. The adjustable grader compactor of claim 3 further comprising:
   a cross-bar disposed generally parallel with a longitudinal axis of said cylindrical roller, and
   a plurality of cleaning tines extending generally radially towards said cylindrical roller from said cross-bar.

5. The adjustable grader compactor of claim 4 wherein the cross bar is rigidly attached to and disposed between said roller support arms rearwardly of said cylindrical roller.

6. The adjustable grader compactor of claim 3 wherein:
   the frame comprises a pair of generally parallel side plates.

7. The adjustable grader compactor of claim 3 wherein:
   the frame support member is an integral portion of the frame.

8. The adjustable grader compactor of claim 3 wherein:
   the frame support member is pivotally attached to said frame.

9. The adjustable grader compactor of claim 3 wherein:
   the force assist member is pivotally attached to said frame.

10. The adjustable grader compactor of claim 3 wherein:
    the pivot member comprises a gusset plate.

11. The adjustable grader compactor of claim 3 wherein:
    the pivot member comprises a pivot pin.

12. The adjustable grader compactor of claim 3 further comprising:
    a roller axle and a roller mounting reinforcement member, said roller mounting reinforcement member being affixed to said roller support arm rearwardly of said pivot plate and said roller axle being pivotally combined with said roller mounting reinforcement member.

13. The adjustable grader compactor of claim 1 wherein the force assist member causes the blade to adjust elevationally and in relation to the ground engagement angle.

14. The adjustable grader compactor of claim 3 wherein additional material can be inserted into the roller to increase its weight.

15. The adjustable grader compactor of claim 3 wherein the roller is comprised of two separate generally cylindrical rollers capable of rotating independently about the same axis.

16. An adjustable grader compactor for leveling earth and compacting the leveled earth said adjustable grader compactor comprising:
    a blade;
    a frame combined with said blade and extending generally upwardly therefrom;
    a rearwardly extending frame support member having a forward end and a rearward end, said frame support member being combined with said frame near said frame support member forward end;
    a force assist member having a forward end and a rearward end, said force assist member being combined with said frame near said force assist member forward end;
    a pivot member being pivotally combined with said frame support member near said frame support member rearward end and being pivotally combined with said force assist member near said force assist member rearward end;
    a roller support arm, said roller support arm being combined with said pivot member and extending generally rearwardly therefrom;
    a roller being pivotally combined with said roller support arm rearward of said pivot member;
    the roller comprising a generally cylindrical roller having a plurality of compaction tines extending radially therefrom;
    a cross-bar disposed generally parallel with a longitudinal axis of said cylindrical roller;
    a plurality of cleaning tines extending generally radially towards said cylindrical roller from said cross-bar; and
    wherein the cross bar is rigidly attached to and disposed between said roller support arms rearwardly of said cylindrical roller.

* * * * *